Nov. 25, 1952 B. A. TREVOR 2,619,587
DIVERSITY RECEIVING SYSTEM
Filed July 23, 1949
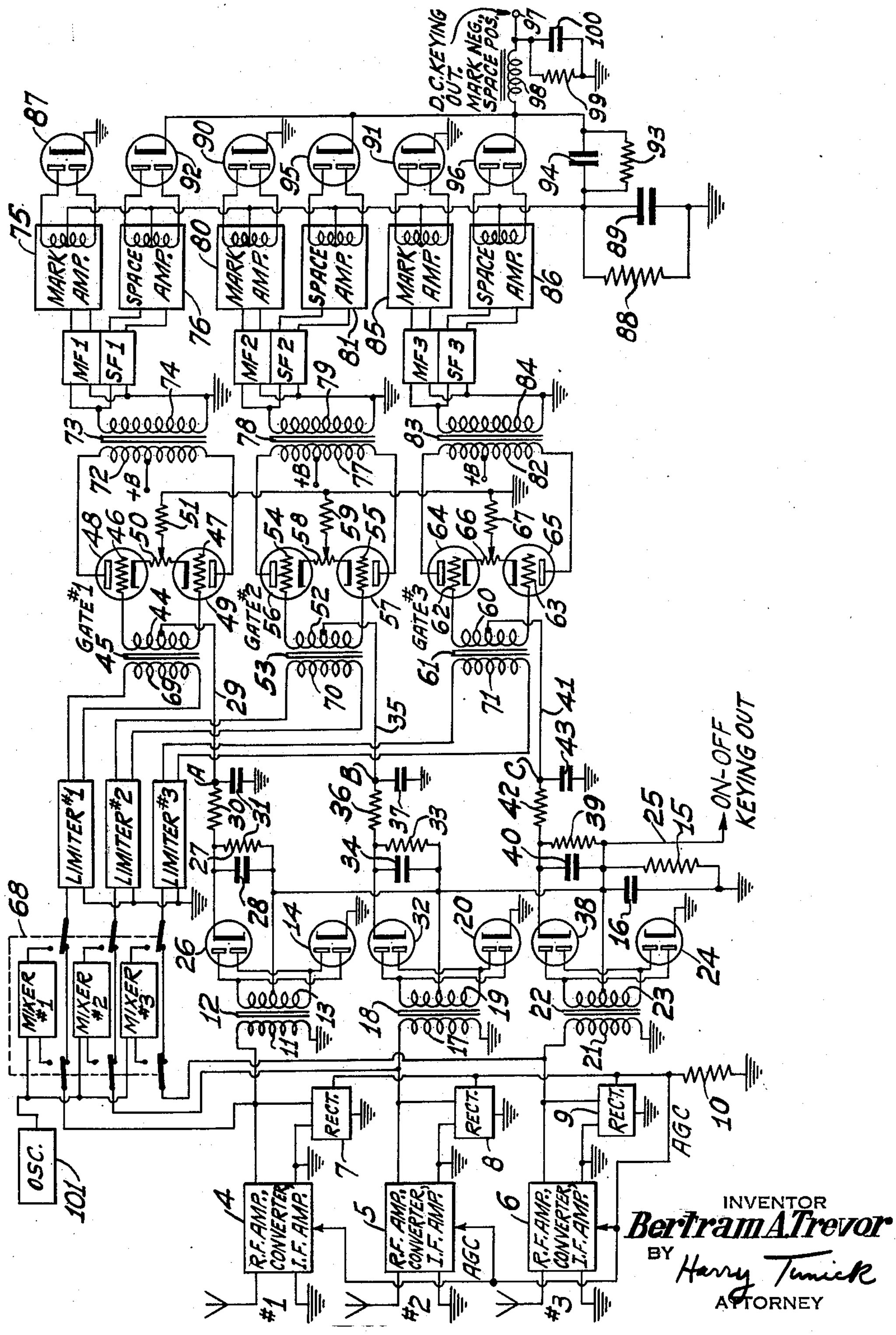
INVENTOR
Bertram A. Trevor
BY Harry Tunick
ATTORNEY Patented Nov. 25, 1952 2,619,587

UNITED STATES PATENT OFFICE 2,619,587

DIVERSITY RECEIVING SYSTEM

Bertram A. Trevor, Riverhead, N. Y., assignor to Radio Corporation of America, a corporation of Delaware Application July 23, 1949, Serial No. 106,465

11 Claims. (Cl. 250—8)

This invention relates to diversity reception, and more particularly to diversity reception of frequency shift keying signals.

An object of this invention is to devise a relatively simply three-set diversity system for frequency shift keying signals.

Another object is to provide a system for use with two or more receivers operating from spaced antennas, which system will operate to allow the best signal to suppress the weaker ones, thus providing effective switching between receivers.

A further object is to devise a diversity system in which the strongest signal always contributes to the system output and in which any weak signals are eliminated, yet in which if two or more signals are equally good they all contribute to the system output.

A still further object is to devise a diversity receiving system for frequency shift keying signals which provides for three-set diversity but which is readily adaptable for two-set diversity.

The foregoing and other objects of the invention will be best understood from the following description of some exemplifications thereof, reference being had to the accompanying drawing, wherein the single figure is a part schematic, part detailed diagram of an arrangement for carrying out the invention.

The objects of this invention are accomplished, briefly, in the following manner:

The outputs of the receivers are separately rectified and applied to respective individual loads, and are also separately rectified and applied to a common load which is connected in opposed polarity to the individual loads. The resultant potential on each of the individual loads controls or switches separately a corresponding pair of gate tubes to which is applied a signal from a corresponding receiver. To the output of each pair of gate tubes are coupled separate mark and space filters, followed by separate mark and space amplifiers. The mark signals are rectified in separate diodes and may be combined thereafter in a common load; similarly, the space signals are rectified in separate diodes and may be combined thereafter in a common load which is connected differentially and in opposed polarity to the mark signal common load. Since combination is effected after rectification, no cancellation takes place and more than one signal may contribute at one time to the system output.

Referring now more particularly to the drawing, three diversity receivers 4, 5 and 6 have their inputs connected to be supplied by respective spaced signal pick-up antennas indicated as #1,

#2 and #3. Each of the receivers 4, 5 and 6 is of the superheterodyne type and includes at least a radio frequency amplifier, a converter and an intermediate frequency amplifier. The outputs of the receivers are separately rectified by rectifiers 7, 8 and 9, the rectified outputs being fed in turn to a common load resistor 10 the voltage across which is taken off and applied as an AGC bias to each of the receivers 4, 5 and 6. The receivers have this common AGC bias provided from the single load 10, these connections acting in such a way that the gains of the three receivers are substantially equal to each other for all levels of incoming signal strength.

The intermediate frequency output of receiver 4, in addition to being fed to rectifier 7, is fed to the primary 11 of transformer 12, the secondary 13 of which is connected to double diode 14 in a manner such as to produce full-wave rectification of the voltage appearing in said secondary. Diode 14 operates into a common load consisting of a resistor 15 and a capacitor 16 connected in parallel, one end of this parallel R. C. combination being grounded (as is the cathode of diode 14) and the other end of said combination being connected to the mid-point of secondary 13.

Similarly, the I. F. output of receiver 5, in addition to being fed to rectifier 8, is fed to the primary 17 of transformer 18, the secondary 19 of which is connected to double diode 20 to produce full-wave rectification of the voltage appearing in said secondary. Diode 20 also operates into the common load 15, 16. The I. F. output of receiver 6, in addition to being fed to rectifier 9, is fed to the primary 21 of transformer 22, the secondary 23 of which is connected to double diode 24 to produce full-wave rectification of the voltage appearing in said secondary. Diode 24 also operates into the common load 15, 16.

The three I. F. signals from receivers 4, 5 and 6, which are all of the same frequency, are rectified and applied to the common load 15, 16, as is customary in the usual receiver for use with on-off keying. An on-off keying output connection 25 is taken off the upper ungrounded end of load 15, 16.

The voltage appearing in secondary 13 is also rectified in a full-wave manner by double diode 26 which operates into an individual load circuit consisting of a parallel R. C. combination 27, 28 which is connected between the cathode of diode 26 and the mid-point of said secondary. Output lead 29 is connected to load circuit 27, 28 through a single-section R. C. filter 30, 31 which removes carrier frequency components and allows components at keying frequencies to pass. It is desired to be pointed out that the voltage drop developed across load 27, 28 by diode 26 is of opposite polarity to that developed across load 15, 16 by diode 14, both voltages being considered with respect to their effects at point A.

Similarly, the voltage appearing in secondary 19 is rectified in a full-wave manner by double diode 32 which operates into an individual load circuit consisting of a parallel R. C. combination 33, 34, output lead 35 being connected to load circuit 33, 34 through a single-section R. C. filter 36, 37 which is similar to filter 30, 31 and carries out a similar function. The voltage drop developed across load 33, 34 by diode 32 is of opposite polarity to that developed across load 15, 16 by diode 20, both voltages being considered with respect to their effects at point B. In like manner, the voltage appearing in secondary 23 is rectified in a full-wave manner by double diode 38 which operates into an individual load circuit consisting of a parallel R. C. combination 39, 40, output lead 41 being connected to load circuit 39, 40 through a single-section R. C. filter 42, 43 which is similar to filter 30, 31 and performs a similar function. The voltage drop developed across load 39, 40 by diode 38 is of opposite polarity to that developed across load 15, 16 by diode 24, both voltages being considered with respect to their effects at point C.

Assume for the moment a steady normal input to the primary winding 21 of transformer 22 and zero input to primaries 11 and 17. This will produce at the on-off keying output 25 a steady negative D. C. potential produced by the action of diode 24 operating into its load 15, 16. Diode 38 will operate independently of diode 24, giving the same voltage drop in opposite polarity across its load 39, 40; hence, the potential of point C with respect to ground will be zero for all levels of input to primary 21. Since there is zero input to primaries 11 and 17 there will be no voltage drop across diode loads 27, 28 and 33, 34, which causes points A and B to be at the negative potential of the on-off output lead 25.

If we now assume that the signal levels on primaries 11 and 17 are gradually increased, we will find that the negative potentials at points A and B will approach zero linearly as these two I. F. signal levels approach the level of the I. F. signal on primary 21.

To make this somewhat clearer, let us assume that the I. F. signal level on primary 21 is such as to produce at the on-off lead 25 a negative potential of twenty volts. Also, assume that the I. F. signal levels on primaries 11 and 17 are each three-quarters of the signal level on primary 21. Since the three signals are effectively applied to a common diode load 15, 16, the strongest, namely that of channel #3, will determined the voltage drop across this load, and it will be twenty volts. However, the voltage drop across diode load 39, 40 is also twenty volts and the drops across loads 27, 28 and 33, 34 are only fifteen volts. Hence, the potential to ground at points A and B will be minus five volts whereas the voltage to ground at point C will be zero, it being recalled that the voltage drops across individual loads 27, 28 and 33, 34 and 39, 40 are all of opposite polarities to that across common load 15, 16. It may be seen that if all three I. F. inputs are equal the three points A, B and C will all be at zero potential with respect to ground.

The three output leads 29, 35 and 41 supply control bias to gates #1, #2 and #3. Lead 29 is connected to the mid-point of the secondary 44 of a transformer 45, the two opposite ends of said secondary being connected to corresponding control electrodes 46 and 47 of gate triodes 48 and 49. The cathodes of triodes 48 and 49 are connected together through a resistor 50 which has a movable tap thereon, resistor 50 being provided to balance the gate against push-push or cophasal components and the movable tap thereon being connected to ground through a suitable resistor 51. Similarly, lead 35 is connected to the mid-point of the secondary 52 of a transformer 53, the two opposite ends of said secondary being connected to corresponding control electrodes 54 and 55 of gate triodes 56 and 57. The cathodes of triodes 56 and 57 are connected together through a resistor 58 which has a movable tap thereon, said movable tap being connected to ground through a suitable resistor 59. In like manner, lead 41 is connected to the mid-point of the secondary 60 of a transformer 61, the two opposite ends of said secondary being connected to corresponding control electrodes 62 and 63 of gate triodes 64 and 65. The cathodes of triodes 64 and 65 are connected together through a resistor 66 which has a movable tap thereon, said movable tap being connected to ground through a suitable resistor 67.

The I. F. outputs of the receivers 4, 5 and 6 are fed to the inputs of separate corresponding limiters (directly, when ganged switching arrangement 68 is in the position illustrated), one for each channel and denoted as #1, #2 and #3, respectively. The output of limiter #1 is applied directly to the primary 69 of transformer 45 to feed the limited I. F. output of receiver 4 to gate #1. The output of limiter #2 is applied directly to the primary 70 of transformer 53 to feed the limited I. F. output of receiver 5 to gate #2, while the output of limiter #3 is applied directly to the primary 71 of transformer 61 to feed the limited I. F. output of receiver 6 to gate #3.

The anodes of gate tubes 48 and 49 are connected to opposite ends of the primary winding 72 of an output transformer 73, the secondary 74 of which is connected to the input of a mark-space filter discriminator shown in the double box labeled MF1 and SF1. The output of the mark filter MF1 is applied to the input of a mark amplifier 75, while the output of the space filter SF1 is applied to the input of a space amplifier 76. Similarly, the anodes of gate tubes 56 and 57 are connected to opposite ends of the primary winding 77 of an output transformer 78, the secondary 79 of which is connected to the input of a mark-space filter discriminator shown in the double box labeled MF2 and SF2. The output of the mark filter MF2 is applied to the input of a mark amplifier 80, while the output of space filter SF2 is applied to the input of a space amplifier 81. In like manner, the anodes of gate tubes 64 and 65 are connected to opposite ends of the primary winding 82 of an output transformer 83, the secondary 84 of which is connected to the input of a mark-space filter discriminator shown in the double box labeled MF3 and SF3. The output of the mark filter MF3 is applied to the input of a mark amplifier 85, while the output of space filter SF2 is applied to the input of a space amplifier 86.

As previously explained, the strongest I. F. signal (that in channel #3 under the assumed conditions) will provide zero grid bias on its gate tubes, thus allowing the output of its respective limiter to pass through the corresponding mark-space filter discriminator. If the other I. F. signal levels are lower, then the corresponding gate tubes will have varying amounts of negative bias applied to them, depending upon the I. F. signal level. It is quite feasible to design the circuit in such manner that a difference in level of 3 db will completely cut off the gate of the weaker signal.

The output of mark amplifier 75 is rectified in full-wave manner by twin diode 87 which feeds into a common load consisting of a resistor 88 and a capacitor 89 connected in parallel, one end of this parallel R. C. combination being grounded (as is the cathode of diode 87) and the other end of said combination being connected to the mid-point of the secondary of the output transformer of amplifier 75. Similarly, the output of mark amplifier 80 is rectified in full-wave manner by twin diode 90 which also feeds into the common "mark" load 88, 89, while the output of mark amplifier 85 is rectified in full-wave fashion by twin diode 91 which also feeds into the common load 88, 89. The connections are preferably so arranged that, in response to the appearance of a signal in the output of any or all of the mark amplifiers 75, 80 and/or 85, the upper end of resistor 88 goes negative with respect to ground.

In a FSK telegraphy system, for which the diversity arrangement of the present invention is particularly designed, a certain predetermined frequency is transmitted to represent space signals, while another and different frequency is transmitted to represent mark signals. The mark-space filter discriminators MF1, SF1, MF2, etc., function to separate the mark and space frequencies for application to the respective corresponding mark and space amplifiers.

The output of space amplifier 76 is rectified in full-wave manner by twin diode 92 which feeds into a common "space" load consisting of a resistor 93 and a capacitor 94 connected in parallel, one end of this parallel R. C. combination being connected to the cathodes of diodes 92, 95 and 96 and the other end of said combination being connected to the mid-point of the secondary of the output transformer of amplifier 76. Similarly, the output of space amplifier 81 is rectified in full-wave fashion by twin diode 95 which also feeds into the common load 93, 94, while the output of space amplifier 86 is rectified in full-wave manner by twin diode 96 which also feeds into the common load 93, 94. The connections are preferably so arranged that, in response to the appearance of a signal in the output of any or all of the space amplifiers 76, 81 and/or 86, the left end of resistor 93 goes negative with respect to its right end.

It may be seen, from the foregoing description, that the "mark" diodes 87, 90 and 91 and the "space" diodes 92, 95 and 96 are connected differentially with respect to an output terminal 97, since when space signals are received the left end of resistor 93 is negative with respect to its right end, while when mark signals are received the upper end of resistor 88, which is adjacent to the left end of resistor 93, is negative with respect to the lower end of resistor 88.

The two diode loads 88, 89 and 93, 94, in combination with a reactance 98 (which is connected in series between output terminal 97 and the right end of resistor 93) and the parallel R. C. combination 99, 100 (which is connected between terminal 97 and ground) are adjusted to provide a properly terminated low pass filter to pass the differential D. C. keying and to eliminate carrier frequency components. Since the right end of resistor 93 is connected to terminal 97 and since the upper end of resistor 88 is connected to such terminal, when mark signals are received a direct voltage negative with respect to ground will appear at terminal 97, while when space signals are received a direct voltage positive with respect to ground will appear at terminal 97.

As has been explained previously, if all three I. F. inputs are equal the three points A, B and C will all be at zero potential relative to ground. Therefore, if all three signals have equal levels, all three gates are open and signals are supplied to all three mark-space filter discriminators, in which case all three signals contribute to the differentially connected diodes 87, 90, 91 and 92, 95, 96 operating into their common diode loads 88, 89 and 93, 94. With the arrangement of this invention, it is immaterial whether one, two or three signals are contributing at one time. No cancellation can take place because combination is effected in a common diode load; in other words, since the signals are combined only after rectification, they are all effectively in aiding relation in the common diode load in which they are combined.

If one or two of the I. F. signal levels go lower than the level of the strongest signal, then the corresponding gates will have varying amounts of negative bias supplied to them, depending upon the I. F. levels. When these one or two signal levels go lower than the level of the strongest signal by a certain predetermined amount, such as three db for example, the negative bias supplied to the corresponding gates is sufficient to close such gates. Therefore, if one or two signals become so weak that their respective limiters produce nothing but noise, the diode switching scheme of this invention will provide gate bias to cut off this unwanted limiter output. In this way, the strongest signal is always contributing to the output of the system and any weak signals are eliminated; if two or more signals are equally or almost equally good, they all contribute to the system output.

Switching arrangement 68 allows a variation of the system to be had. An oscillator 101 is arranged to supply oscillatory energy to three separate mixers #1, #2 and #3, one for each of the three channels. Switch contacts at the input and output sides of these mixers, arranged as shown, are engageable by switching arms actuated by gang switch 68 to connect, at will, a separate mixer into each channel between a receiver and its corresponding limiter. By the insertion of these mixers into the channels, together with the oscillator 101, the I. F. outputs of the receivers are heterodyned or beaten down in the frequency spectrum. This allows the mark-space filter discriminators to operate at a different frequency from that of the intermediate frequency energy supplied from the three receivers 4, 5 and 6. Under these conditions, the mark-space filters operate at frequencies in the audio spectrum, whereas the intermediate frequency energy would normally be higher in frequency.

The system of this invention can be used with any number of receivers by duplicating the equipment described. Normally three-set diversity is the maximum used; however, the system is adaptable to two-set diversity by omitting one pair of diodes, one gate, one mark-space filter, one mark and one space amplifier and one pair of final differential diodes.

The limiters are more or less conventional and perform the same function as in other FSK telegraphy systems, which is the elimination of unwanted amplitude variations from the received signals.

I claim:

1. In a diversity receiving system for frequency shifted telegraphy signals one frequency of which represents mark and another frequency of which represents space, a plurality of receivers fed from spaced antennas, a plurality of controllable gating devices equal in number to the number of receivers, means for applying a portion of the output of each receiver to a corresponding gating device, means for controlling each gating device in dependence only upon the output signal level of its corresponding receiver, separate mark and space amplifiers, operative at different frequencies, coupled to the output of each gating device, means for separately rectifying the output of each mark amplifier and for applying all of the rectified outputs to a common load, means for separately rectifying the output of each space amplifier and for applying all of said last-named rectified outputs to a common load, and means for coupling the two common loads together to provide output voltages for the system.

2. In a diversity receiving system for frequency shifted telegraphy signals one frequency of which represents mark and another frequency of which represents space, a plurality of receivers fed from spaced antennas, a plurality of controllable gating devices equal in number to the number of receivers, means for applying a portion of the output of each receiver to a corresponding gating device, means for controlling each gating device in dependence only upon the output signal level of its corresponding receiver, separate mark and space filters, operative to pass corresponding frequencies, coupled to the output of each gating device, a mark amplifier coupled to the output of each mark filter, a space amplifier coupled to the output of each space filter, the mark and space amplifiers being operative at different frequencies, means for separately rectifying the output of each mark amplifier and for applying all of the rectified outputs to a common load, means for separately rectifying the output of each space amplifier and for applying all of said last-named rectified outputs to a common load, and means for coupling the two common loads together to provide output voltages for the system.

3. In a diversity receiving system for frequency shifted telegraphy signals one frequency of which represents mark and another frequency of which represents space, a plurality of receivers fed from spaced antennas, a plurality of controllable gating devices equal in number to the number of receivers, means for applying a portion of the output of each receiver to a corresponding gating device, means for controlling each gating device in dependence upon the output signal level of its corresponding receiver, separate mark and space filters, operative to pass corresponding frequencies, coupled to the output of each gating device, a mark amplifier coupled to the output of each mark filter, a space amplifier coupled to the output of each space filter, the mark and space amplifiers being operative at different frequencies, means for separately rectifying the output of each mark amplifier and for applying all of the rectified outputs to a common load, means for separately rectifying the output of each space amplifier and for applying all of said last-named rectified outputs to a common load, means for coupling the two common loads together differentially to provide direct voltages of opposite polarities for mark and space signals, a connection between the two loads and an output terminal, and a low pass filter in said connection.

4. In a diversity receiving system, a plurality of receivers fed from spaced antennas, separate means equal in number to the number of receivers for rectifying a portion of the output of each receiver and for applying all of the rectified outputs to a common load, separate means coupled to each receiver for rectifying another portion of the output of each receiver and for separately feeding each of the last-named rectified outputs individually to separate loads individual to each receiver, means for combining the voltage developed across said common load with the voltages developed across each of said separate loads to derive a plurality of resultant control voltages, a plurality of controllable gating devices equal in number to the number of receivers, means for applying a portion of the output of each receiver to a corresponding gating device, means for controlling each of said gating devices by that control voltage which is derived from the separate load associated with the same receiver as is the gating device being controlled, an amplifier coupled to the output of each gating device, and means for separately rectifying the output of each amplifier and for applying all of the rectified outputs to a common load.

5. In a diversity receiving system for frequency shifted signals, a plurality of receivers fed from spaced antennas, means for separately rectifying a portion of the output of each receiver and for applying all of the rectified outputs to a common load to develop thereacross a voltage, means for applying said voltage to all of said receivers as a gain control voltage therefor, means for separately rectifying another portion of the output of each receiver and for applying all of the last-named rectified outputs to a common load, means for separately rectifying another portion of the output of each receiver and for feeding each of the last-named rectified outputs to separate loads individual to each reciver, means for combining in opposition the voltage developed across said common load with the voltages developed across each of said separate loads to produce a plurality of resultant control voltages, a plurality of controllable gating devices equal in number to the number of receivers, connections coupling a limiter to the output of each of said receivers, heterodyning means in said connections for reducing the frequency of the energy fed from said receivers to said limiters, means coupling the output of each of said limiters to a corresponding gating device, connections for applying each of said control voltages to a corresponding one of said gating devices to control the same, and a low pass filter in each of said last-named connections.

6. In a diversity receiving system for frequency shifted telegraphy signals one frequency of which represents mark and another frequency of which represents space, a plurality of receivers fed from spaced antennas, means for separately rectifying a portion of the output of each receiver and for applying all of the rectified outputs to a common load, means for separately rectifying another portion of the output of each receiver and for feeding each of the last-named rectified outputs to separate loads individual to each receiver, means for combining in opposition the voltage developed across said common load with the voltages developed across each of said separate loads to produce a plurality of resultant control voltages, a plurality of controllable gating devices equal in number to the number of receivers, means for applying a portion of the output of each receiver to a corresponding gating device, means for controlling each of said gating devices by a corresponding one of said control voltages, separate mark and space amplifiers, operative at different frequencies, coupled to the output of each gating device, means for separately rectifying the output of each mark amplifier and for applying all of the last-named rectified outputs to a common load, means for separately rectifying the output of each space amplifier and for applying all of said last-named rectified outputs to a common load, and means for coupling the two last-named common loads together to provide output voltages for the system.

7. In a diversity receiving system for frequency shifted telegraphy signals one frequency of which represents mark and another frequency of which represents space, a plurality of receivers fed from spaced antennas, means for separately rectifying a portion of the output of each receiver and for applying all of the rectified outputs to a common load, means for separately rectifying another portion of the output of each receiver and for feeding each of the last-named rectified outputs to separate loads individual to each receiver, means for combining the voltage developed across said common load with the voltages developed across each of said separate loads to produce a plurality of resultant control voltages, a plurality of controllable gating devices equal in number to the number of receivers, connections for applying a portion of the output of each receiver to a corresponding gating device, a limiter in each of said connections, means for controlling each of said gating devices by a corresponding one of said control voltages, separate mark and space filters, operative to pass corresponding frequencies, coupled to the output of each gating device, means for separately rectifying the output of each mark filter and for applying all of the last-named rectified outputs to a common load, means for separately rectifying the output of each space filter and for applying all of said last-named rectified outputs to a common load, and means for coupling the two last-named common loads together differentially to provide as system output direct voltages of opposite polarities for mark and space signals.

8. In a diversity receiving system for frequency shifted telegraphy signals one frequency of which represents mark and another frequency of which represents space, a plurality of receivers fed from spaced antennas, means for separately rectifying a portion of the output of each receiver and for applying all of the rectified outputs to a common load, means for separately rectifying another portion of the output of each receiver and for feeding each of the last-named rectified outputs to separate loads individual to each receiver, means for combining in opposition the voltage developed across said common load with the voltages developed across each of said separate loads to produce a plurality of resultant control voltages, a plurality of controllable gating devices equal in number to the number of receivers, connections coupling a limiter to the output of each of said receivers, heterodyning means in said connections for reducing the frequency of the energy fed from said receivers to said limiters, means coupling the output of each of said limiters to a corresponding gating device, means for controlling each of said gating devices by a corresponding one of said control voltages, separate mark and space filters, operative to pass corresponding frequencies, coupled to the output of each gating device, means for separately rectifying the output of each mark filter and for applying all of the last-named rectified outputs to a common load, means for separately rectifying the output of each space filter and for applying all of said last-named rectified outputs to a common load, and means for coupling the two last-named common loads together differentially to provide as system output direct voltages of opposite polarities for mark and space signals.

9. In a diversity receiving system for frequency shifted telegraphy signals one frequency of which represents mark and another frequency of which represents space, a plurality of receivers fed from spaced antennas, means for separately rectifying a portion of the output of each receiver and for applying all of the rectified outputs to a common load, means for separately rectifying another portion of the output of each receiver and for feeding each of the last-named rectified outputs to separate loads individual to each receiver, means for combining in opposition the voltage developed across said common load with the voltages developed across each of said separate loads to produce a plurality of resultant control voltages, a plurality of controllable gating devices equal in number to the number of receivers, connections for applying a portion of the output of each receiver to a corresponding gating device, a limiter in each of said connections, connections for applying each of said control voltages to a corresponding one of said gating devices to control the same, a low pass filter in each of said last-named connections, separate mark and space filters, operative to pass corresponding frequencies, coupled to the output of each gating device, means for separately rectifying the output of each mark filter and for applying all of the last-named rectified outputs to a common load, means for separately rectifying the output of each space filter and for applying all of said last-named rectified outputs to a common load, and means for coupling the two last-named common loads together differentially to provide as system output direct voltages of opposite polarities for mark and space signals.

10. In a diversity receiving system for frequency shifted telegraphy signals one frequency of which represents mark and another frequency of which represents space, a plurality of receivers fed from spaced antennas, means for separately rectifying a portion of the output of each receiver and for applying all of the rectified outputs to a common load, means for separately rectifying another portion of the output of each receiver and for feeding each of the last-named rectified outputs to separate loads individual to each receiver, means for combining in opposition the voltage developed across said common load with the voltages developed across each of said separate loads to produce a plurality of resultant control voltages, a plurality of controllable gating devices equal in number to the number of receivers, connections for applying a portion of the output of each receiver to a corresponding gating device, a limiter in each of said connections, connections for applying each of said control voltages to a corresponding one of said gating devices to control the same, a low pass filter in each of said last-named connections, separate mark and space filters, operative to pass corresponding frequencies, coupled to the output of each gating device, a mark amplifier coupled to the output of each mark filter, a space amplifier coupled to the output of each space filter, the mark and space amplifiers being operative at different frequencies, means for separately rectifying the output of each mark amplifier and for applying all of the last-named rectified outputs to a common load, means for separately rectifying the output of each space amplifier and for applying all of said last-named rectified outputs to a common load, and means for coupling the two last-named common loads together differentially to provide as system output direct voltages of opposite polarities for mark and space signals.

11. In a diversity receiving system for frequency shifted telegraphy signals one frequency of which represents mark and another frequency of which represents space, a plurality of receivers fed from spaced antennas, means for separately rectifying a portion of the output of each receiver and for applying all of the rectified outputs to a common load, means for separately rectifying another portion of the output of each receiver and for feeding each of the last-named rectified outputs to separate loads individual to each receiver, means for combining in opposition the voltage developed across said common load with the voltages developed across each of said separate loads to produce a plurality of resultant control voltages, a plurality of controllable gating devices equal in number to the number of receivers, connections coupling a limiter to the output of each of said receivers, heterodyning means in said connections for reducing the frequency of the energy fed from said receivers to said limiters, means coupling the output of each of said limiters to a corresponding gating device, connections for applying each of said control voltages to a corresponding one of said gating devices to control the same, a low pass filter in each of said last-named connections, separate mark and space filters, operative to pass corresponding frequencies, coupled to the output of each gating device, a mark amplifier coupled to the output of each mark filter, a space amplifier coupled to the output of each space filter, the mark and space amplifiers being operative at different frequencies, means for separately rectifying the output of each mark amplifier and for applying all of the last-named rectified outputs to a common load, means for separately rectifying the output of each space amplifier and for applying all of said last-named rectified outputs to a common load, means for coupling the two last-named common loads together differentially to provide direct voltages of opposite polarities for mark and space signals, a connection between the two coupled loads and an output terminal, and a low pass filter in said last-named connection.

BERTRAM A. TREVOR.

REFERENCES CITED

The following references are of record in the file of this patent:

UNITED STATES PATENTS

| Number | Name | Date |
|---|---|---|
| 2,070,418 | Beverage | Feb. 9, 1937 |
| 2,249,425 | Hansell | July 15, 1941 |
| 2,253,867 | Peterson | Aug. 26, 1941 |
| 2,383,126 | Hollingsworth | Aug. 21, 1945 |
| 2,384,456 | Davey | Sept. 11, 1945 |
| 2,389,919 | Matthews | Nov. 27, 1945 |
| 2,488,193 | Hughes | Nov. 15, 1949 |
| 2,492,780 | Atwood | Dec. 27, 1949 |